US006172981B1

(12) United States Patent
Cox et al.

(10) Patent No.: US 6,172,981 B1
(45) Date of Patent: Jan. 9, 2001

(54) METHOD AND SYSTEM FOR DISTRIBUTING NETWORK ROUTING FUNCTIONS TO LOCAL AREA NETWORK STATIONS

(75) Inventors: Norman Eugene Cox, Raleigh, NC (US); Kenneth J. Christensen, Tampa, FL (US); Jim P. Ervin; Richard Colbert Matlack, Jr., both of Raleigh, NC (US)

(73) Assignee: International Business Machines Corporation, Armonk, NY (US)

(*) Notice: Under 35 U.S.C. 154(b), the term of this patent shall be extended for 0 days.

(21) Appl. No.: 08/961,114

(22) Filed: Oct. 30, 1997

(51) Int. Cl.[7] .................................................. H04L 12/28
(52) U.S. Cl. ........................... 370/401; 370/395; 370/405
(58) Field of Search ..................................... 370/401, 402, 370/403, 404, 409, 399, 397, 395, 389; 709/245

(56) References Cited

U.S. PATENT DOCUMENTS

| 5,309,437 | | 5/1994 | Perlman et al. | 370/85.13 |
| 5,329,527 | * | 7/1994 | Ujihashi et al. | 370/401 |
| 5,351,237 | | 9/1994 | Shinohara et al. | 370/58.3 |
| 5,426,637 | | 6/1995 | Derby et al. | 370/85.13 |
| 5,774,662 | * | 6/1999 | Sakagawa | 709/245 |
| 5,909,441 | * | 6/1999 | Alexander, Jr. et al. | 370/395 |
| 5,996,021 | * | 11/1999 | Civanlar et al. | 370/392 |

FOREIGN PATENT DOCUMENTS 5235944  9/1993 (JP) ............................... H04L/11/00

OTHER PUBLICATIONS

IBM TDB vol. 35, No. 4A, Sep. 1992, pp. 21–24.
IBM TDB vol. 35, No. 7, Dec. 1992, pp. 254–255.

* cited by examiner

Primary Examiner—Chi H. Pham
Assistant Examiner—Frank Duong
(74) Attorney, Agent, or Firm—John J. Timar

(57) ABSTRACT

A route switching layer is provided to end stations on a local area network (LAN) segment between the network layer protocol stack and the LAN adapter device driver. The route switching layer reads the network layer protocol header in a data frame queued for transmission. If the data frame is destined for a station on a different LAN segment, the route switching layer compares the network layer address with entries stored in a local address table. If a match occurs, the route switching layer inserts the corresponding data link layer address from the table in the data link header that is appended to the data frame. The data frame is then transmitted directly from source to destination end station by a hardware switch. If an address table match does not occur, the source station route switching layer sends a query to a route server device for the data link layer address corresponding to the network layer address of the destination end station. The route server sends a response to the source station route switching layer which then stores the destination address information in the local address table.

21 Claims, 9 Drawing Sheets

METHOD AND SYSTEM FOR DISTRIBUTING NETWORK ROUTING FUNCTIONS TO LOCAL AREA NETWORK STATIONS

BACKGROUND OF THE INVENTION

The present invention relates in general to an improved data communication and networking system, and in particular, to an improved method and system for conveying data between logically distinct networks by distributing network layer routing functions to individual stations on a network.

Various technologies have evolved for communications and/or data transmission in computer networks, including Ethernet, token ring, fiber distributed data interface (FDDI), and asynchronous transfer mode (ATM). Data transmission within and between networks using such technologies are governed by various protocols, such as frame relay, X.25, integrated services digital network (ISDN), media access control (MAC) address protocol, and transmission control protocol/internet protocol (TCP/IP).

As with other forms of digital communications, data in computer networks is commonly transmitted in packets or frames, i.e., discrete bundles of data. Frames are comprised of various fields, such as header, address, data and control fields. The arrangement or format of these fields within a frame is protocol-dependent. An explanation of some frame formats commonly used in computer networks may be found in Internet Engineering Task Force (IETF) Request for Comments (RFC) 1490, which is incorporated herein by reference. However, it will be understood by those skilled in the art that RFC 1490 is not exhaustive of all frame formats currently in use.

A given communications or data transmission process in a network often requires delivery of multiple packets or frames of data from a source to a destination within the network. For example, retrieval of a file using file transfer protocol (FTP) will generally be accomplished using a large number of frames. Although relating to the same process (i.e., FTP), different frames may be transmitted via different paths within the network. As used herein, a data flow refers to a sequence of related frames sent from a particular source to a particular destination within the network.

Various devices exist for transmitting packets or frames of data within a network or between networks. A bridge or gateway passes frames of data from one network to another, the two networks typically being local area networks. Routers are an evolution beyond bridges, usually routing frames of data at a higher level protocol than is handled by bridges. The oldest routers were internet protocol (IP) routers, but other protocols may be routed including InterPacket Exchange (IPX) by Novell, Inc. and high performance routing (HPR) by International Business Machines Corporation. Like bridges, routers store and forward frames. However, a router, after storing a frame of data, looks into the internal data of the frame for higher protocol information regarding the ultimate destination of the frame. A router then consults an internal table of available paths to the ultimate destination and corresponding protocols supported by those paths, and makes a decision regarding how to route the frame to its ultimate destination.

A switch is a hardware device providing physical connection within or between different networks. Unlike bridges and routers, a switch typically forwards data without first storing the entire frame. The delays inherent in storing the entire frames before forwarding are thus eliminated. A switch transmits the data bits of the frame received from the source port directly to the destination port as soon as the destination is ascertained. Switches are often used as part of virtual circuits (VCs), or defined paths between a given source or destination. A virtual circuit may be either a switched virtual circuit (SVC) or a permanent virtual circuit (PVC). Switched virtual circuits are transient, set up for the benefit of a given process or data flow, and may result in different paths being used between the same source and destination for discrete processes. Permanent virtual circuits (PVCs) are defined paths between a source and destination using designated nodes in a predetermined sequence.

As switching is implemented in LAN environments, LAN connections have moved from shared access transport (SAT) sharing of media to connecting directly to switch ports. The LAN framing remains unchanged, but data flows attempt to pass or "cut through" the switch. Cut through avoids completely storing the frame before forwarding it, passing through the bits as soon as the destination port is known. Adaptive cut through is a variation which seeks to avoid wasting frames if the destination port is already busy by storing the frame in the switch until the destination is available.

Local area networks (LANs) are commonly connected with one another through one or more routers so that a host on one LAN can communicate with hosts on different LANs. A host is a personal computer, workstation or other network entity residing on a LAN and communicating with network entities outside of its own LAN through a router or bridge.

In the past, switching between logically distinct networks was performed at the router. In addition, it was performed at the network layer (layer 3) of the Open Systems Interconnection (OSI) reference model developed as a standard for data networks. This causes the following problems: (1) using routers to convey data frames is expensive because router manufacturers need to support most, if not all, network protocols including IP and IPX; (2) more processing is required since layer 3 routing is higher on the communications layered architecture; (3) because routers are the gateway to other networks, routing speed becomes a bottleneck; (4) layer 3 routing is relatively slow since it is typically implemented in software; and (5) with a purely bridged environment, there is a lack of isolation since a broadcast from a LAN station is conveyed everywhere.

Recently, LANs have undergone a transformation by the replacement of shared media LAN hubs with LAN switches which operate at the data link layer (layer 2) of the OSI model. However, even with LAN switches, routers are still needed to route packets between the logically distinct IP subnetworks.

Since existing layer 2 LAN switches do not support forwarding or routing of layer 3 protocols, there is a need to achieve cost-effective routing capabilities in a switched LAN network. The obvious solution is to add layer 3 routing capability to a LAN switch. This capability may be in the form of dedicated hardware that performs layer 3 routing functions, in addition to layer 2 switching functions, on each frame handled by the LAN switch. Alternatively, additional CPU processing capability within the LAN switch can perform the software-based layer 3 routing function on all layer 3 frames destined for a router layer 2 address (i.e., MAC address) within the LAN switch. The first solution is costly from the standpoint of both development and component costs. The second solution is less costly, but significantly lowers the frames per second throughput of a LAN switch. This lowered throughput is due to the processing required for layer 2 forwarding.

SUMMARY OF THE INVENTION

It is therefore one object of the present invention to provide an improved data communication and networking system.

It is another object of this invention to provide a method for distributing layer 3 routing functions to individual LAN stations.

It is another object of this invention to provide a route switching layer in individual hosts to enable LAN switches to effectively switch layer 3 frames to their correct destination.

The foregoing objects are achieved by the system of The present invention having a route server for mapping layer 2 MAC addresses to layer 3 network addresses. Each end station on a LAN has a route switching layer of programing code which allows the end station to request from The route server the MAC address of the desired destination end station. The route server forwards this MAC s to the en d station which stores the layer 3 network address and the corresponding layer 2 MAC address of the destination end station in a local address table. The data frames are then conveyed from the end station to the destination end station using the MAC address received from the route server. The data frames are conveyed over a hardware switch operating at layer 2, thereby making the data communications fast and inexpensive.

BRIEF DESCRIPTION OF THE DRAWINGS

The novel features believed characteristic of the present invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Before proceeding to a description of the present invention, a brief discussion of the is the layer next to the physical (lowest) layer that is concerned with transmitting of new data bits over the communication channel. The data link layer performs such functions as structuring data into packets or frames, and adding control information such as checksums for error detection. The data link layer is divided into two sublayers: a logical link control (LLC) sublayer, which performs transmission medium-independent functions, and a media access control (MAC) sublayer, which determines which stations get access to the communication channel when there are conflicting requests for access.

Layer 3 is the network layer. It controls routing of information through the network, network initialization, packet addressing, packet switching, and segmenting and formatting of information. The Internet Protocol (IP) is implemented in the network layer of the OSI model. An IP address is a network layer address for a device operating in the IP suite of protocols. In the current version (version 4) of the Internet Protocol (IPV4), the IP address is a 32-bit field for each host and includes a unique network identifier and a host identifier within the network. Routers make use of the destination network identifier in a message to determine an optimum path from the source network to the destination network.

A MAC address is an address of a device at the media access sublayer of the data link layer. MAC addresses are 48 bits long and are available for Ethernet, token ring and fiber distributed data interface (FDDI) LANs. Globally assigned addresses are unique. No two hosts, wherever they are located in the network, have the same MAC address. A MAC address is generally hardcoded into a device. On the other hand, a network layer (IP) address will change depending upon where a device is plugged into a network.

There is a networking protocol called ARP (address resolution protocol), which obtains a MAC address from the corresponding network layer IP address. Typically, each router maintains a database table from which it can look up the MAC address. If a destination host is not in this database, the router transmits an ARP request. Only the addressed destination host responds with an ARP reply; the router then inserts the correct MAC address into the data frame and transmits the data frame to its final destination. The router also adds the destination host MAC address to its database.

Figure 1:
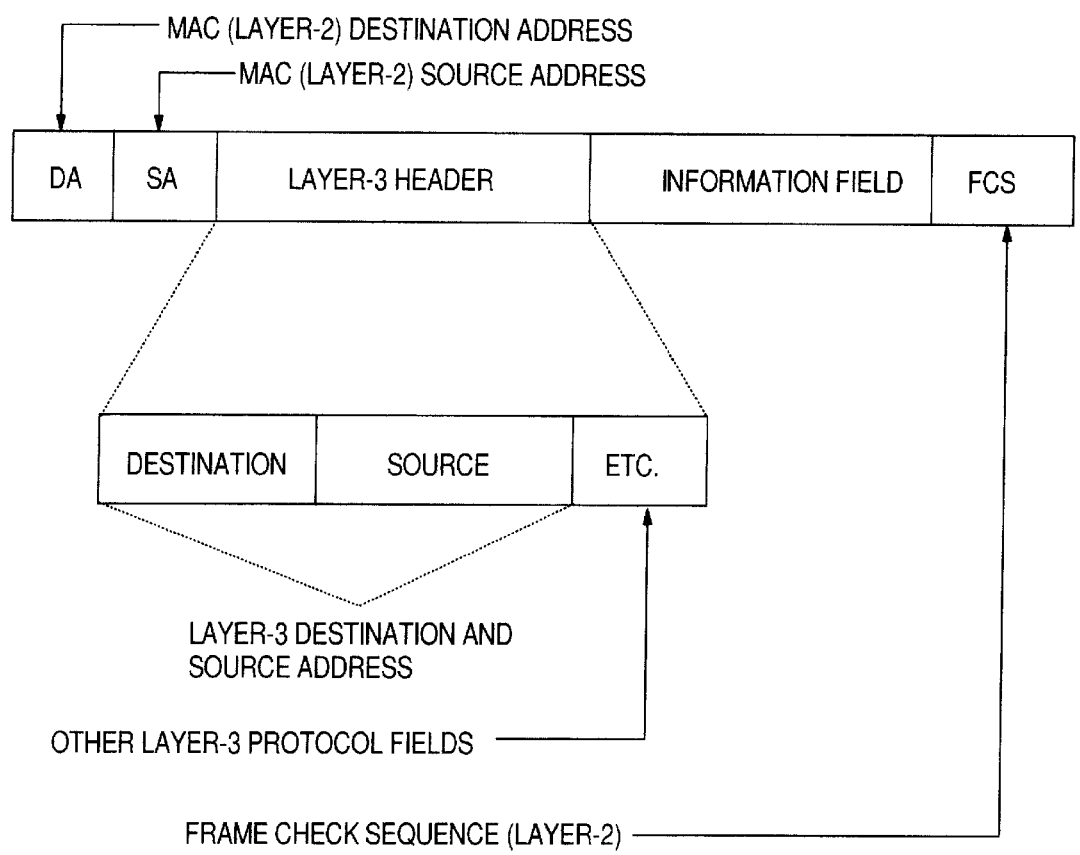
FIG. 1 illustrates the format of a typical local area network data frame which is transmitted between logically distinct network in accordance with the present invention.

As indicated above, layer 3 routing is used by several popular protocols, including IP and IPX. FIG. 1 illustrates the format of a data frame including a layer 3 header. The layer 3 header contains both a destination and a source layer 3 address. Typically, a layer 3 address consists of two parts—a network portion and a host portion. A router, operating at layer 3, uses the layer 3 destination address to determine how and where a frame should be forwarded, i.e., to which MAC destination address should the frame be sent. Thus, routing is based on assigning the correct MAC destination address of the next hop for a frame based on the contents of the layer 3 address within the frame. A layer 3 routing function must look inside the frame to determine frame forwarding actions. In contrast, a layer 2 LAN switch or LAN bridge looks only at the MAC destination address of a frame to determine frame forwarding actions, and does not change the destination address of a received frame.

Figure 2:
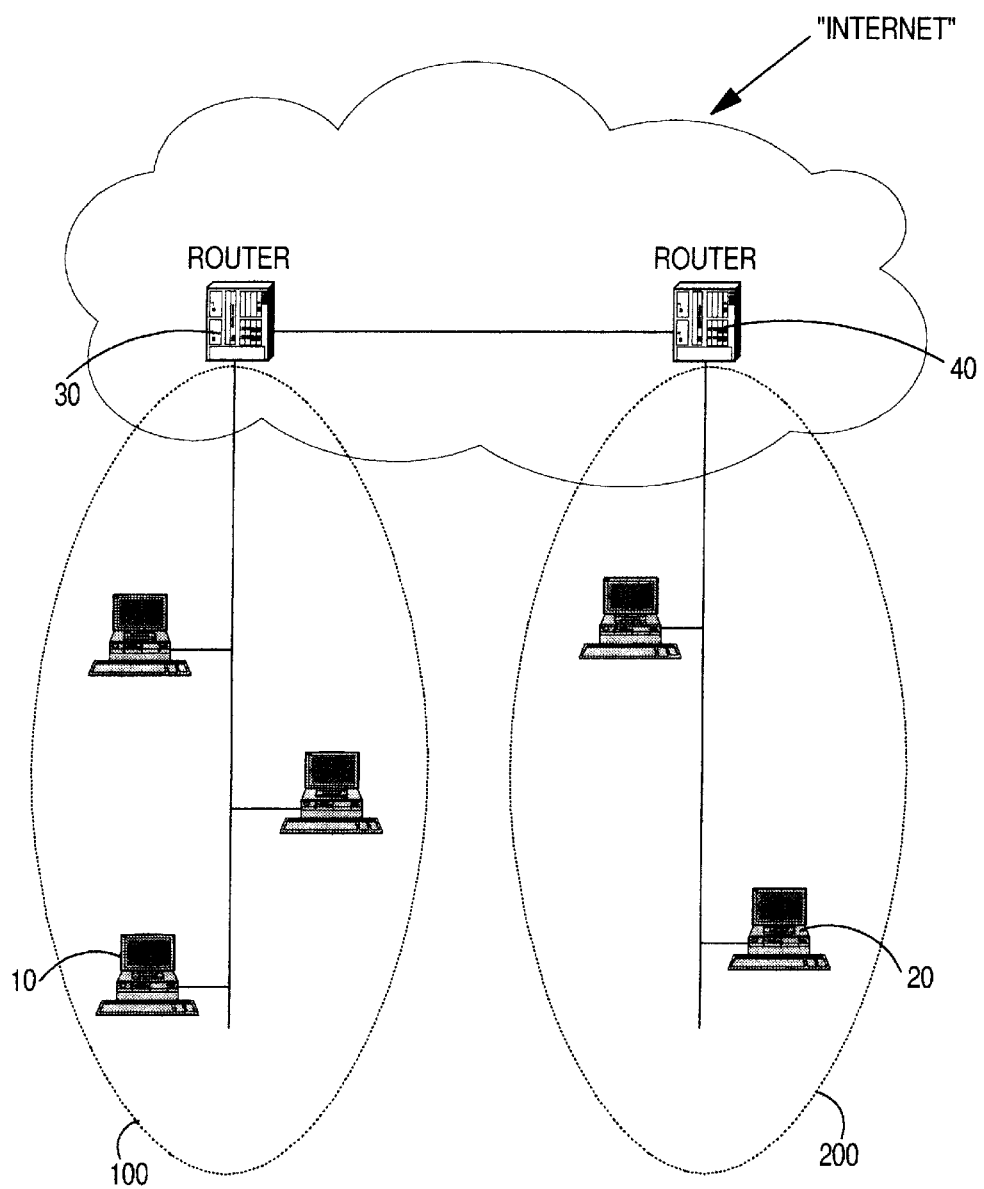
FIG. 2 illustrates a prior art example of router-connected layer 3 networks.

FIG. 2 is a prior art example of two layer 3 networks 100, 200 connected via two routers 30, 40. Each network is a LAN segment in this example. Host 10 on network 100 and host 20 on network 200 communicate via routers 30 and 40. The router ports, host 10 and host 20 all have unique MAC addresses. Certain events occur in order for host 10 to send a frame to host 20. First, the application in host 10 builds a frame destined for host 20. The layer 3 protocol stack in host 10 adds the MAC destination address of router 30 and transmits the frame. Router 30 receives the frame and processes the layer 3 header to determine that the destination host 20 is on network 200. Router 30 then replaces the destination address of the frame with the MAC destination address of router 40 and transmits the frame. Router 40 receives the frame from router 30 and processes the layer 3 header to determine that the destination host 20 is on network 200. Router 40 then replaces the destination address of the frame with the MAC destination address of host 20 and sends the frame. Finally, host 20 receives the frame.

Figure 3:
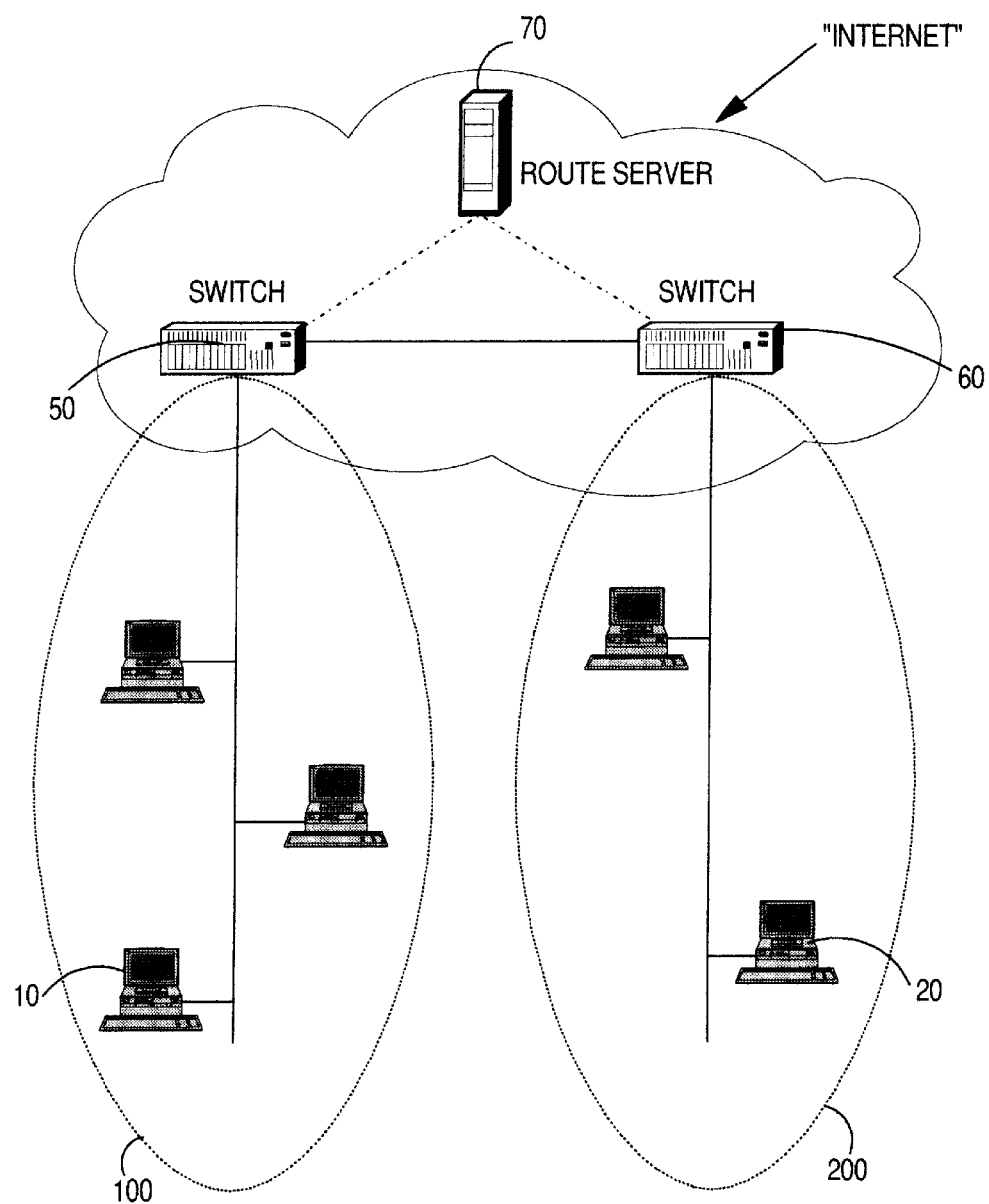
FIG. 3 illustrates an example of switch-connected layer 3 networks.

The present invention is a low cost and high performance solution for routing frames between LAN-attached stations on different networks. This is accomplished by distributing some of the routing functions to the LAN stations. The technique is called "route switching" and exploits the high performance layer 2 switching capabilities of existing LAN switches. FIG. 3 illustrates the network of FIG. 2 with the routers 30, 40 replaced by LAN switches 50, 60. FIG. 3 also shows route server 70 whose function will be described below. Host 10 can directly send frames to host 20 if, and only if, these frames are sent with a destination MAC address equal to the MAC address of host 20. However, the layer 3 protocol of host 10 has no knowledge of the MAC address of host 20 and can only send frames to a well-known router MAC address.

Figure 4:
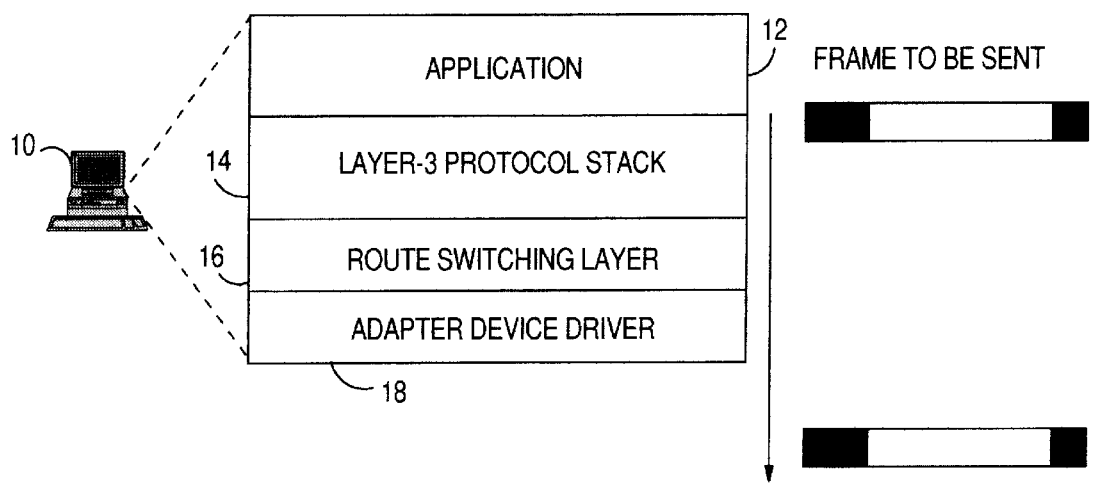
FIG. 4 illustrates the implementation of the route switching software layer in LAN-attached stations of the present invention.

A new layer of software called the "route switching layer" is added to each station on the LAN segment, such as host 10 and host 20 in FIG. 3. As shown in FIG. 4, the route switching layer 16 is added between the layer 3 protocol stack 14 and the LAN adapter MAC device driver 18. The frame to be transmitted to host 20 is built by application 12. FIG. 4 also shows how frames flow from the layer 3 protocol stack 14 through the route switching layer 16 before being transmitted via the device driver 18 and LAN adapter. The frame is transmitted with the MAC destination address of destination host 20. This MAC address is assigned in the route switching layer 16.

In operation, the route switching layer 16 reads the layer 3 protocol header in the frame being queued for transmission. If the frame is not destined for a station on the same LAN segment, the route switching layer 16 compares the layer 3 address, using an address table, for a layer 3 to layer 2 address match. If a table match occurs, then route switching layer 16 replaces the layer 2 MAC address in the frame with the MAC address from the address table entry. This latter MAC address is the MAC address of the destination host 20 in FIG. 3. If a table match does not occur, then route switching layer 16 sends a query to route server 70 that contains the layer 3 destination address that did not result in an address table match. The route server 70 will return a response to the query that contains the correct MAC address for destination host 20. This MAC address is then inserted into the address table at host 10 for future use. The methods used by the route server 70 to determine addresses of layer 3 destination hosts are well known in the art, and are outside the scope of the present invention. There are known methods based on station registration by which route servers can be designed. The route server can be implemented in any network device providing network layer (i.e., layer 3) routing services, including routers, switching hubs and integrated switch routers.

Figure 5:
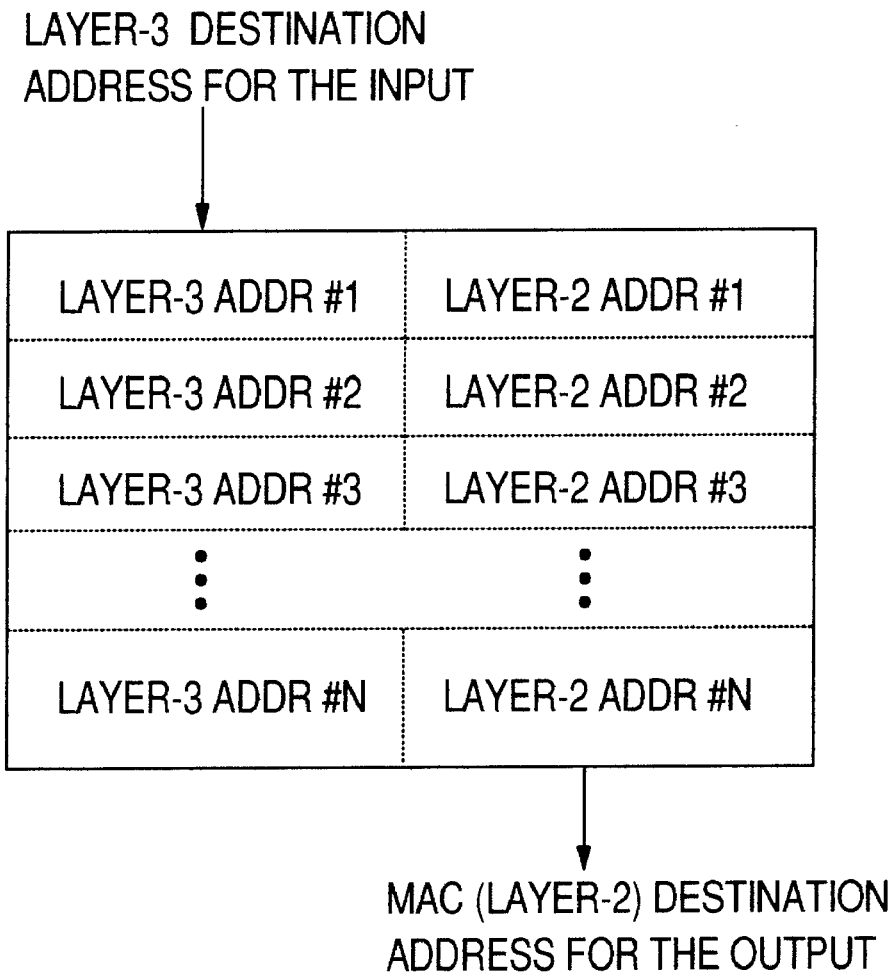
FIG. 5 illustrates an example of the address table of the route switching software layer of the present invention.

FIG. 5 illustrates the structure of the address table associated with the route switching software layer at an individual LAN station. It shows the internal layer 3 to layer 2 address mapping. A separate table exists for each layer 3 protocol stack supported by a LAN station. If a LAN station has both IP and IPX loaded, a separate address table exists for each. Incorporating a route switching layer at each LAN station enables all frames to be transmitted with the correct destination host MAC address. LAN switches, operating at layer 2, can directly switch the transmitted frames to their final destination. This distribution of the layer 3 routing functions to the stations of a LAN results in higher aggregate throughput than concentrating the routing function for a network of stations in a single CPU within a LAN switch.

Figure 6:
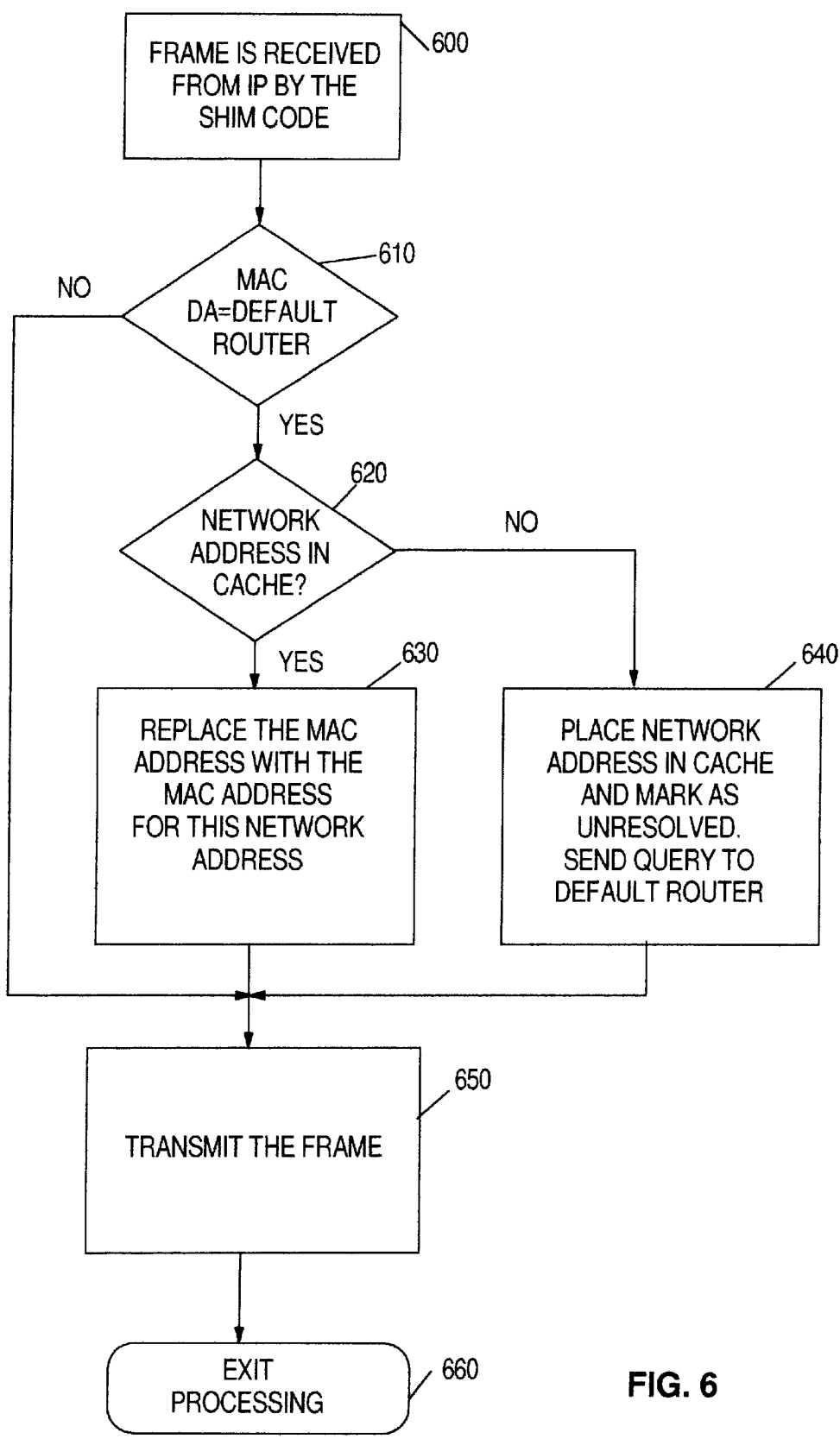
FIG. 6 illustrates the logic steps performed by the route switching software layer of the present invention.

FIG. 6 is a flowchart showing the logic steps performed by route switching layer 16 of the present invention. In step 600, the host workstation application 12 has sent a frame to the IP protocol stack 14. The frame has passed through the protocol stack 14 and is being intercepted by route switching software layer 16. In step 610, the route switching software 16 checks to see if the MAC address in the frame is equal to the MAC address of default router (route server 70). If the MAC address in the frame is equal to the default router address, then in step 620 the layer 3 address in the frame is compared to the known addresses stored in the local cache address table. If the MAC address in the frame is not equal to the default router address in step 610, then the destination MAC address is on the same LAN segment and the frame is transmitted directly to the destination LAN station in step 650. In step 620, if the level 3 address in the frame matches one of the addresses stored in the cache address table, then the MAC header is replaced with the information from the cache as indicated in logic step 630. Then in step 650, the frame is passed to the adapter device driver 18 to be transmitted. If in step 620, the network layer 3 address did not match any of the entires in the cache address table, the address is placed in the cache address able and marked as unresolved. A query is sent to the default router (route server 70) to determine the correct MAC address of the destination host 20; the MAC address then being placed in the cache address table for future use. Once the MAC addressed is resolved, the frame is transmitted in step 650. Exit from the route switching software occurs in step 660.

Figure 7:
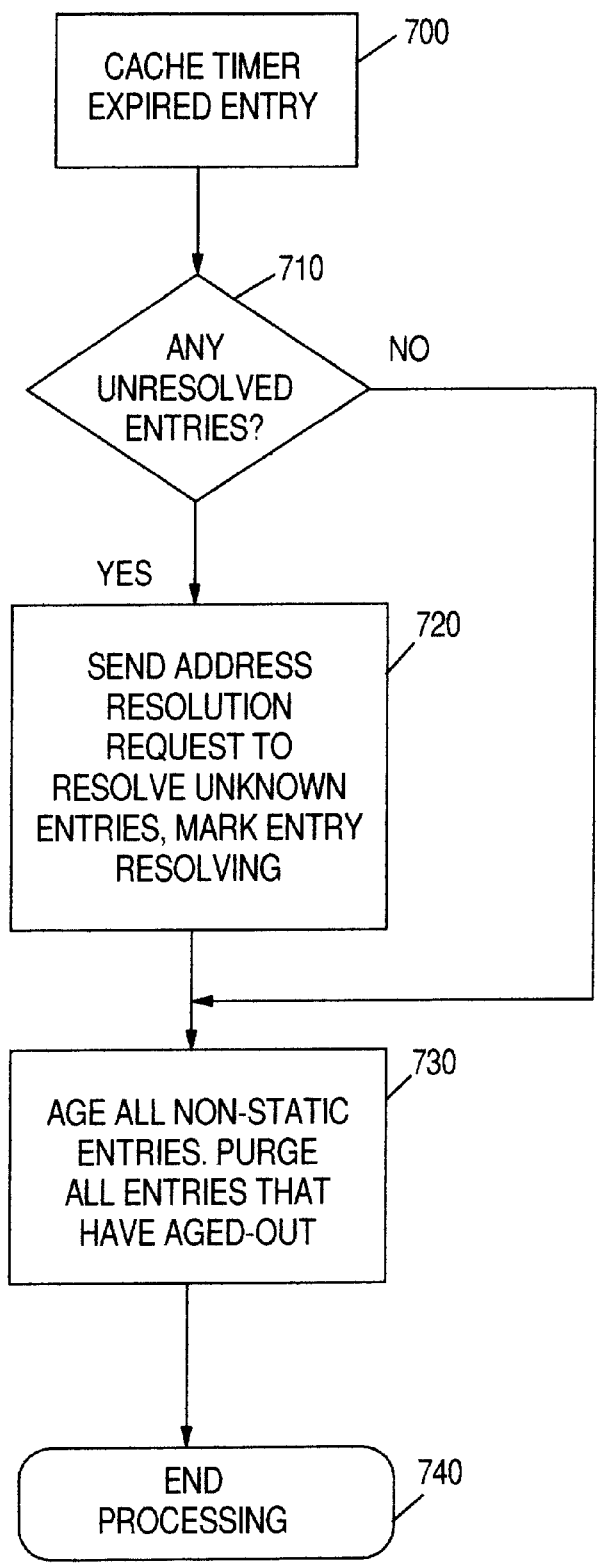
FIG. 7 illustrates the logic steps performed in LAN-attached stations to maintain the address table of the route switching software layer of the present invention.

FIG. 7 is a flowchart depicting the logic steps performed by the route switching software 16 in a LAN station to maintain the cache address table. Although not critical to the operation of this invention, the cache address table of FIG. 5 can also have additional fields associated with each entry, in particular, a holding time (time-to-live) for the cache entry and a state for the entry. The state can take on 3 values: "unresolved", "resolving" and "resolved". When the state for an entry in "unresolved", the layer 3 network address does not have a corresponding layer 2 MAC address. The LAN station 10 sends a resolution request to the route server 70 to resolve the network address. When the state is "resolving", the LAN station 10 has sent a resolution request to the route server 70 but has not yet received a reply. If the holding time counts down to zero and no reply is received, the entry is purged from the cache. When the state is "resolved", the layer 2 network address has a corresponding MAC address. The LAN station 10 has received an affirmative reply from the route server 70. This correspondence between the layer 3 network address and layer 2 MAC address are assumed to be valid until the holding time counts down to zero, at which time the entry is purged from the cache. During this time, all frames destined for the layer 3 network address are route switched by modifying the MAC address in the frame to the actual destination MAC address. In step 700, a cache timer routine is invoked for the local address table. In step 710, a test is made for any unresolved entries in the table. If there are unresolved entries, then in step 720, an address resolution request is sent to the default router (route server 70) to resolve the entries, such entries then being marked as "resolving". This is followed in step 730 by aging all non-static entries, and purging those entries that have aged out. Cache address table processing ends in step 740.

The route switching invention described herein can be implemented in the context of a non-broadcast multi-access (NBMA) subnetwork such as Asynchronous Transfer Mode (ATM), which is a connection-oriented, high speed networking technology based on cell switching. When a routable internetworking protocol such as IP and IPX is used with NBMA subnetworks like X.25, frame relay or ATM, the routed path through the network may involve several hops across the same subnetwork.

Figure 8:
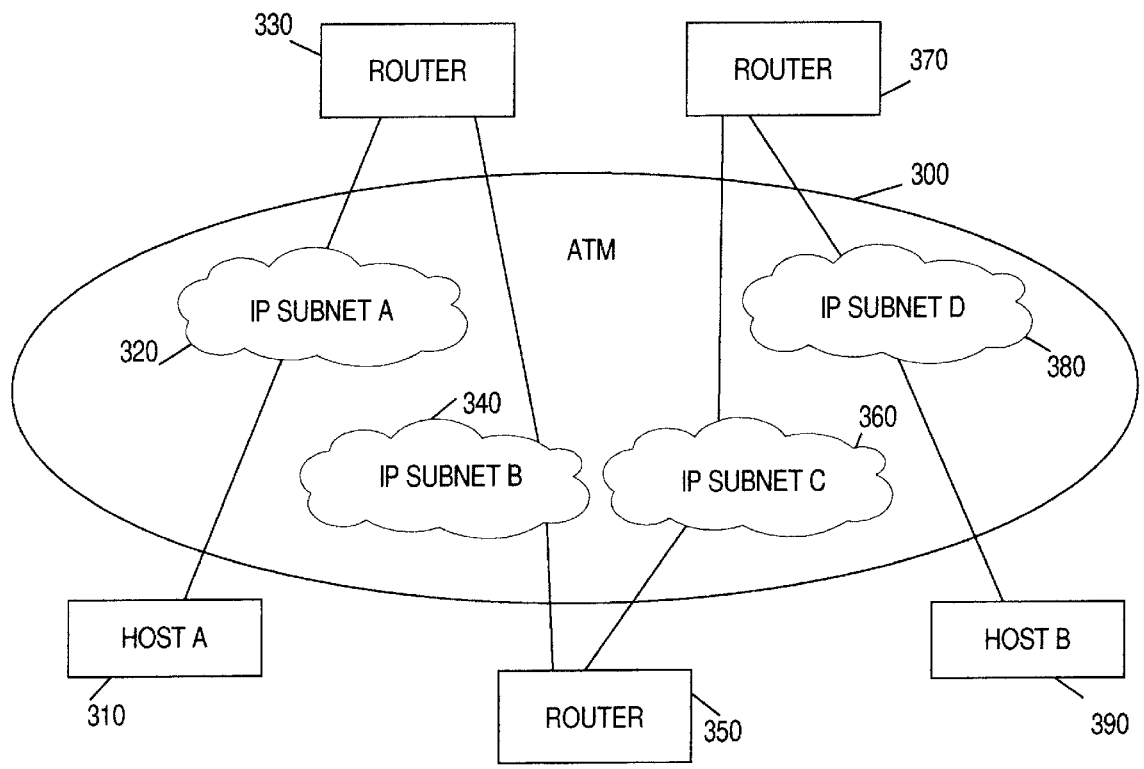
FIG. 8 illustrates the multiple router hops across an ATM network that can occur between source and destination hosts using the IP protocol.

FIG. 8 illustrates the routing hops that can occur in an ATM subnetwork that has been partitioned into IP subnets. ATM is used in this example primarily as a high-speed data link technology providing connectivity between hosts and routers. Packets from host 310 to host 390 encounter three router hops and traverse the ATM subnetwork 300 four times: (1) host 310 to router 330 across IP subnet 320; (2) router 330 to router 350 across IP subnet 340; (3) router 350 to router 370 across IP subnet 360; and (4) router 370 to host 390 across IP subnet 380. Next Hop Resolution Protocol (NHRP) is a draft specification of the Internet Engineering Task Force (IETF) that addresses network performance by eliminating router hops on a NBMA subnetwork. NHRP was designed to better utilize the underlying switched infrastructure by enabling the establishment of short cut routes across ATM subnetworks. The short cut may be directly to the destination or to the egress router nearest to the destination.

Specifically, in the context of an ATM environment using NHRP, the present invention provides "zero-hop" route switching that enables a station attached to a legacy LAN such as token ring or Ethernet to achieve an inter-subnet layer 2 data path to the destination that is free of layer 3 routing hops. This requires implementation of the route switching layer in the legacy LAN attached station (NHRP client). The route switching layer, when implemented in a LAN-attached workstation, resolves layer 3 network addresses to layer 2 MAC addresses effectively creating a switched connection for connectionless traffic, enabling an end station to bypass one or more routers when sending data.

The route switching layer client code is platform specific, i.e., the client code will be different for AIX, DOS, OS/2, Windows 95, Windows NT, Novell, etc. The route switching layer client code is implemented as a protocol driver between the end station's protocol stacks and the network device driver as illustrated in FIG. 4. The route switching client examines every packet transmitted and attempts to learn short cut routes to destinations. If a short cut route exists to the destination end station, the route switching client will modify the MAC address of the outgoing frame to the actual MAC address of the destination end station. Moving the routing function to the edges of the network as described herein maximizes the performance of switching technology and significantly improves the price/performance ratio over that of stand-alone routers. Thus, routing capacity can be added incrementally reducing the expensive investment in traditional network routers.

Although NHRP is a very extensive protocol, the end station client only uses a small subset. It queries the route server (e.g. reference numeral 70 in FIG. 3) with only two kinds of NHRP requests. The first is to send out a broadcast packet during startup to determine the route server's MAC address. The second is to send a network address resolution request to the route server, so that the latter can reply with the MAC address of the destination. By knowing the destination network and the corresponding MAC address, the client can cut through directly to the intended destination. This short cut is stored in the route switching cache.

Figure 9:
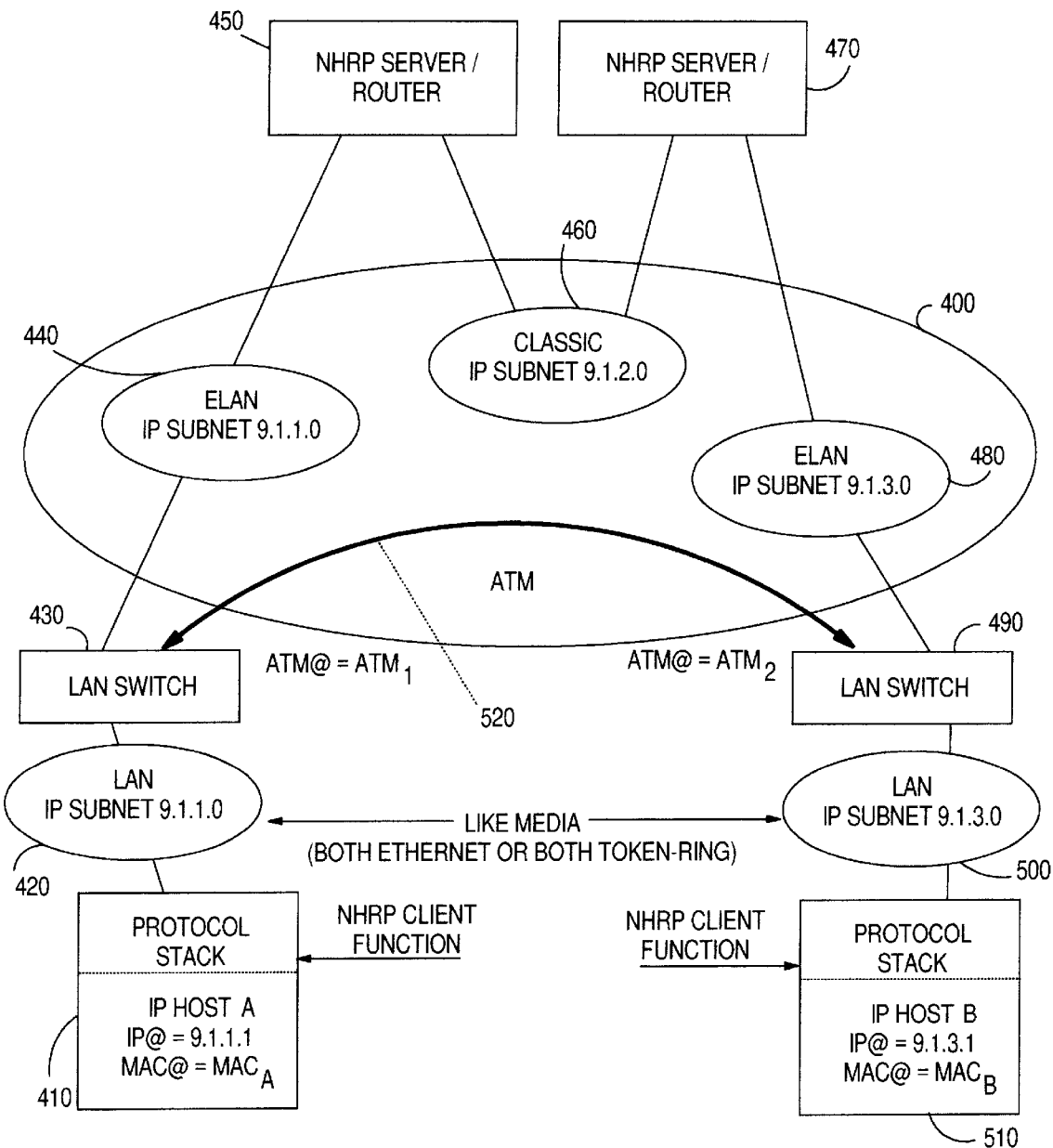
FIG. 9 illustrates "zero-hop" route switching between ATM-attached LAN switches using the present invention.

FIG. 9 illustrates an example of the use of "zero-hop route switching" control flows to establish a layer 2 path from a source station to a destination. Once the layer 2 path is established, the "zero-hop route switching" protocol is not involved in actual data transfer. In the scenario depicted in FIG. 9, the NHRP clients 410, 510 (with route switching layer implemented) in the end stations communicate with their default routers 450, 470 over emulated LANs (ELANs) 440, 480. ELANs 440, 460, 480 are LAN segments implemented with ATM technology. The clients 410, 510 use NHRP to learn about each other's layer 2 information when traffic is being routed. Subsequent traffic is sent using the end station's layer 2 information in the data link header. This triggers the LAN switches 430, 490 to establish a short cut virtual circuit 520.

Referring now to FIG. 9, during initialization NHRP clients 410, 510 in legacy LAN-attached stations discover the MAC address of the NHRP servers 450, 470 which are also the corresponding default routers. When inter-subnet traffic is forwarded to the MAC address of router 450, client 410 issues an NHRP resolution request to determine the layer 2 information associated with the protocol address of destination 510, having an IP address 9.1.3.1. The layer 2 information contains the destination MAC address, and for token ring networks, the routing information field (RIF).

The ingress NHRP server 450, i.e., the server on the source ELAN 440, communicates via other NHRP servers along the routed path to the destination 510 and obtains the necessary information from the egress NHRP server 470, i.e., the server on the destination ELAN 480. In FIG. 9, NHRP server 450 obtains the layer 2 information ($MAC_B$ and the RIF from the NHRP server 470 to IP host B 510) and the ATM address ($ATM_2$) from NHRP server 470.

The ingress NHRP server 450 replies to the client 410 with the layer 2 information associated with the destination protocol address specified in the initial NHRP resolution request. In the scenario depicted in FIG. 9, the NHRP resolution reply sent to IP host 410 contains $MAC_B$ and the RIF from IP host A 410 to IP host B 510, which is a concatenation of the RIF from IP host A 410 to NHRP server 450, a virtual route descriptor (RD), and the RIF from NHRP server 470 to IP host B 510.

The NHRP client 410 uses the supplied layer 2 information to build the data link header for frames transmitted to the associated destination 510 protocol address, instead of the usual procedure of sending frames using the layer 2 information of router 450 in the data link header. In FIG. 9, this means that IP host A 410 uses $MAC_B$ and the RIF from IP host A 410 to IP host B 510 in the data link header for frames transmitted to IP address 9.1.3.1. Frames destined for $MAC_B$ are then delivered via the normal layer 2 procedures which results in a data direct virtual channel connection between the ATM attached LAN switches 430, 490.

The scenario depicted in FIG. 9 assumes that both clients 410 and 510 support the NHRP client function. If IP host B 510 is a non-NHRP end station, the NHRP client 410 can still establish a "zero-hop" path for traffic to the non-NHRP host. However, traffic from the nonNHRP host 510 flows on the routed path to NHRP server 470 and then via a virtual path short cut to LAN switch 430.

While the invention has been particularly shown and described with reference to the particular embodiments thereof, it will be understood by those skilled in the art that various changes in form and details may be made therein without departing from the spirit and scope of the invention.

Having thus described our invention, what we claim and desire to secure as letters patent is as follows:

What is claimed is:

1. A data communication system having a plurality of interconnected, logically distinct networks for distributing the network routing functions to individual end stations on each network, comprising:
   at least one switch for providing a data link layer switching function between said logically distinct networks;
   a source end station on a first logical network;
   a destination end station on a second logical network, said destination end station having a network layer address and a data link layer address;
   a route server connected to said first and second logical networks for providing to said source end station, an address mapping from the network layer address to the data link layer address of the destination end station;
   route switching programming code in said source end station for requesting from said route server the data link layer address of said destination end station corresponding to said network layer address, and inserting said data link layer address in each data frame to be transmitted to said destination end station; and
   an address table at said source end station for storing a mapping of said destination end station network layer address to said data link layer address.

2. The data communication system of claim 1 wherein said plurality of logically distinct networks communicate using the internet protocol (IP).

3. The data communication system of claim 1 wherein said plurality of logically distinct networks communicate using the interpacket exchange protocol (IPX).

4. The data communication system of claim 1 wherein said at least one switch conveys data frames from said source end station to said destination end station using the data link layer address received from said route server.

5. The data communication system of claim 1 wherein said route switching programming code at said source end station is added between a network layer protocol stack and an adapter device driver at said source end station.

6. The data communication system of claim 1 wherein said address table at said source end station includes for each destination end station in the address table at least a network layer address and a corresponding data link layer address.

7. The data communication system of claim 1 wherein said logically distinct networks are each Ethernet local area networks.

8. The data communication system of claim 1 wherein said logically distinct networks are each token ring local area networks.

9. The data communication system of claim 1 wherein one of said logically distinct networks is an Ethernet local area network and another of said logically distinct networks is a token ring network.

10. The data communication system of claim 1 wherein said data link layer address of said destination end station is a unique media access control (MAC) address.

11. The data communication system of claim 1 wherein said logically distinct networks are connected to each other over a non-broadcast multi-access network.

12. The data communication system of claim 11 wherein said non-broadcast multi-access network is an Asynchronous Transfer Mode (ATM) network that is partitioned into a plurality of internet protocol (IP) subnetworks and said individual end stations and said route server implement a Next Hop Resolution Protocol (NHRP) function.

13. The data communication system of claim 11 wherein said non-broadcast multi-access network is an Asynchronous Transfer Mode (ATM) network that is partitioned into a plurality of internet protocol (IP) subnetworks, and said source end station and said route server implement a Next Hop Resolution Hop Protocol (NHRP) function but said destination end station does not implement the NHRP function.

14. In a data communication system having a plurality of interconnected logically distinct networks having at least one switch providing a data link layer switching function for transmitting data frames between said networks, a method for distributing the network routing functions to individual end stations on each network, comprising:
   at a source end station on a first logical network, building said data frame to be transmitted to a destination end station on a second logical network, said data frame having a data link layer header portion and a network layer header portion, said data link layer header portion containing a data link layer address of a route server, said network layer header portion containing a network layer address of said destination end station;
   comparing said destination network layer address with an address table stored at said source end station to determine if there is an entry for said destination network layer address;
   if there is an entry for said destination network layer address, replacing the data link layer address in said data frame to be transmitted with the data link layer address corresponding to said destination end station network layer address; and
   transmitting said data frame by said switch from said source end station to said destination end station.

15. The method of claim 14 including:
   if there is no entry for said destination network layer address, sending a request to said route server for the data link layer address corresponding to said destination network layer address;
   responding to said request by said route server with the data link layer address corresponding to said destination end station;
   replacing the data link layer address in said data frame to be transmitted with the destination end station data link layer address returned by said route server; and
   inserting said destination network layer address and corresponding data link layer address as an entry in said address table.

16. The method of claim 14 wherein said examining and replacing steps are performed by a route switching logic in said source end station.

17. The method of claim 14 wherein said logically distinct networks are local area networks with said source end station communicating with said destination end station using the internet protocol (IP).

18. The method of claim 14 wherein said logically distinct networks are connected to each other over a non-broadcast multi-access network that is further partitioned into a plurality of logical subnetworks, said source and destination end stations and said route server implementing a Next Hop Resolution Protocol (NHRP) function for enabling the establishment of a bidirectional short cut route for data frames transmitted between said source and destination end stations.

19. The method of claim 14 wherein said logically distinct networks are connected to each other over a non-broadcast multi-access network that is further partitioned into a plurality of logical subnetworks, said source end station and said route server implementing a Next Hop Resolution Protocol (NHRP) function to enable the establishment of a short cut route for data frames transmitted from said source end station to said destination end station.

20. A computer program product adaptable for storage on computer storage media comprising:

program code operable for determining a destination network layer address in a network layer header portion of a data frame to be transmitted from a source end station on a first logical network to a destination end station on a second logical network said data frame also having a data link layer header portion having a data link layer address for a route server device connected to said first and second logical networks;

program code operable for comparing said destination network layer address with an address table stored at said source end station and determining if there is an entry for said destination network layer address that has a corresponding data link layer address;

program code operable for replacing said data link layer address of said route server device in said data frame with said data link layer address corresponding to said destination network layer address if said entry is found in said determining step before said data frame is transmitted using a network server device directly to said destination end station.

21. The computer program product of claim 20 including:

program code operable for sending a request to said route server device for the data link layer address corresponding to said destination end station if said entry is not found in said determining step; and program code operable for receiving a response from said route server device containing said corresponding data link layer address, replacing said data link layer address of said route server device in said data frame with the destination data link layer address, and inserting said destination network layer address and corresponding data link layer address in said address table stored at said source end station.

* * * * *